UNITED STATES PATENT OFFICE.

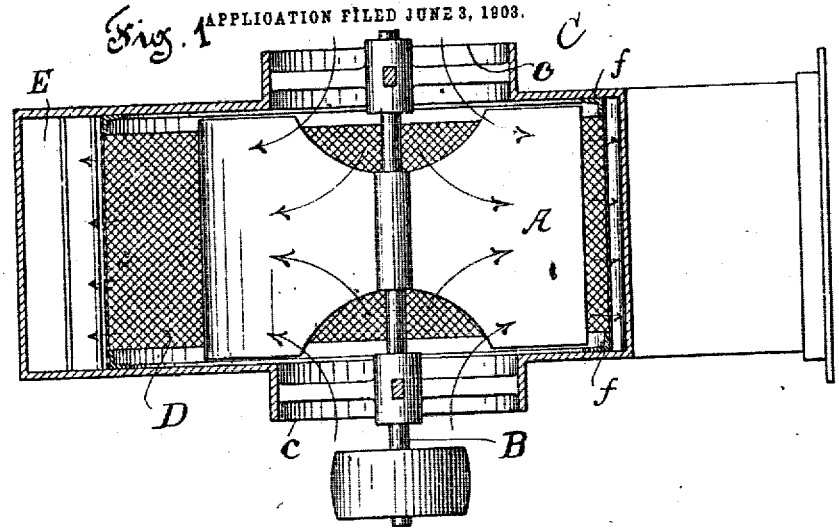
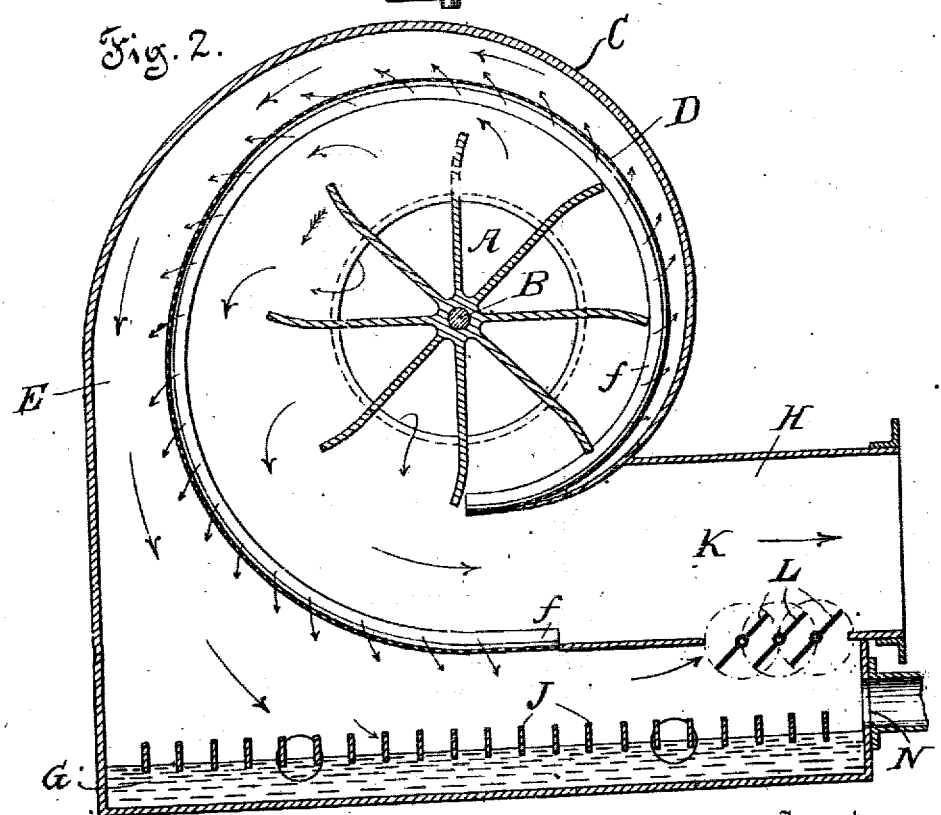

WILLIAM J. BALDWIN, OF NEW YORK, N. Y.

PROCESS OF SEPARATING FINE SUSPENDED PARTICLES FROM AIR AND OTHER GASES.

No. 853,619.

Specification of Letters Patent.

Patented May 14, 1907.

Application filed June 3, 1903. Serial No. 159,917.

*To all whom it may concern:*

Be it known that I, WILLIAM J. BALDWIN, a citizen of the United States of America, and a resident of the borough of Brooklyn, in the city of New York and State of New York, have invented certain new and useful Improvements in Processes of Separating Fine Suspended Particles from Air and other Gases, of which the following is a specification.

This invention relates to improvements in processes of separating fine suspended particles from air and other gases, which are to be used for ventilation, heating and other purposes, as dust from air, and unconsumed carbon from smoke.

The present practice, particularly as applied in ventilation and heating, may be briefly described as follows: At some distance from the blower screens of large area are placed across large chambers or passages, in which the velocity of the air is very small so as not to endanger the bursting of the screens, or the carrying of the suspended particles through them, the purpose of such apparatus being to arrest the dust, and pass the air through the screens freed from dust. As the gently moving air blows through the screens the suspended particles are arrested by the screens, which are of a mesh fine enough to prevent the passage of the particles, and the air freed from the particles is delivered by suitable ducts, registers and like devices to the places of use. In such systems the use of large chambers or passages in which to set the screens is unavoidable, because the high velocity of the air as it leaves the blower must be reduced to so low a velocity as will not burst the screens, or carry the dust through them, and the result is the use of chambers or passages of very great area, to insure relatively very low velocity of the air at the screens. But the requirement of such large areas, necessitates giving up much valuable space in the basements of buildings to these chambers or passages, and involves large expense in their construction. The great screens necessary in such systems are also expensive and liable to injury, as well as cumbrous, and must be cleaned frequently, and are difficult to clean. The result is that the purifying of the air used in ventilating and heating from dust is now only attempted in those cases where the expense is a secondary consideration, as in hospitals, and some other public or quasi-public institutions.

My invention is the reverse of the system above described, in that it effects the separation of the suspended particles by blowing them at high velocity, with a part of the air or gas through a screen which is in the immediate vicinity of the blower where the velocity of the air is highest. The screen is of small dimensions, is made of such materials and strength as to readily resist the air or gas pressures without bursting, and is preferably in the blower case, where it is protected from injury.

The air or gas which remains inside the screen, being freed from the suspended particles, flows away to the place of use, while the air or gas which passed through the screen with the suspended particles may be caused to flow over or past suitable devices, such as a body of water, by which the said suspended particles are arrested and deposited, and may finally be mingled with the air or gas which did not pass through the screen, and may go with it to the place of use; or the air or gas which passed through the screen with the suspended particles may be allowed to blow away without being used.

To the more clearly explain my invention I have illustrated a convenient form of apparatus in drawings which accompany this specification, and which apparatus is hereinafter described, but I do not herein claim the apparatus, the same being claimed in my application for Letters Patent of the United States, filed June 3, 1903, Serial number 159,918.

Referring to said drawings, Figure 1 is a horizontal section and plan of a blower for operating my process of dust separation. Fig. 2 is a side vertical section of the same.

Hereinafter using the term "gas" to mean air, or other gases, and referring to the reference letters on said drawings, A is the fan of a centrifugal blower, on a shaft B, and in a blower case C, which said case may be of any desired size and shape, as either the ordinary blower case as shown, or the walls of the room in which the fan is placed; and gas entering by the centrifugal inlets $c\ c$ impinges with high velocity on the permeable diaphragm D, which is preferably a galvanized steel or iron wire mesh, of such coarseness as to let the dust or other suspended particles pass through. The screen D is preferably of volute shape, as shown, as is also the blower case C, and is arranged in the said case with a space E between it and the walls of the case, as by securing it to flanges f. When the gas at high velocity impinges on the screen D, as hereinbefore stated, a part of the gas, and all or practically all, the suspended particles are blown through the screen, while the remaining part of the gas, now freed from the suspended particles, flows around the screen and to the outlet H, whence it passes by suitable ducts to the places of use. The gas which passed through the screen D with the particles flows downward in the space between the screen and the wall of the blower case carrying suspended particles with it, and the said particles may be arrested and deposited by any suitable means, as a body of water G in a vessel or chamber in the lower part of the blower case. To aid in arresting the particles, and to prevent the rapidly moving gas from too greatly agitating the water, grids J J are preferably employed, which are partly immersed in the water as shown, and arranged across the direction of the air movement. After the suspended particles have been caught and deposited in the water, the gas in the space E above the water, now freed from the suspended particles, passes by the opening K, which is controlled by dampers L L, into the body of gas from which the particles were originally separated, the commingling taking place at a point away from the immediate vicinity of the screen D, so that the commingling volumes of gas will not again be blown through the screen. From the opening K the commingled gas flows through the outlet H and suitable ducts or passages to the places of use.

Instead of mingling the gas which passed through the screen with that which did not, it may be allowed to blow away through a suitable outlet as N, or it may blow directly into atmosphere through the screen. For, it is not essential to my process that the gas which first passed through the screen with the suspended particles should afterward be commingled with the gas which did not pass through, and I can of course use only the gas which did not pass through the screen for ventilation and heating or other purposes, but economy of power in the blowers usually makes it desirable to use all the gas delivered by the blowers for the ventilating, heating, or other purpose. Said outlet N will be provided with a suitable valve to regulate the opening.

Now having described my improvements, I claim as my invention,

1. The process of separating suspended particles from gases, which consists in impelling a gas at a high velocity against a permeable diaphragm arranged in closed chamber and having orifices sufficiently large to permit of the passage of the suspended particles, and thereby forcing the said particles and a part of the gas through said diaphragm, and removing the remaining portion of the gas from the immediate vicinity of said diaphragm and particles.

2. The process of separating suspended particles from gases, which consists in impelling the gas at relatively high velocity against a permeable diaphragm arranged in closed chamber and which is provided with orifices sufficiently large to permit said particles to pass through, and thereby forcing said particles and a part of the gas through said diaphragm, arresting said particles after they have passed through the said diaphragm, whereby their remixing with the gas which did not pass through is prevented, and removing the remaining part of the gas from the vicinity of the said diaphragm and arrested particles, substantially as described.

3. The process of separating suspended particles from gases, which consists in impelling the gas at relatively high velocity against a permeable diaphragm arranged in closed chamber and which is provided with orifices sufficiently large to permit said particles to pass through, and thereby forcing said particles and a part of the gas through said diaphragm, arresting said particles by a body of liquid after they have passed through said diaphragm, whereby they are prevented from returning into the gas, and mixing gas which passed through the diaphragm and from which the said particles have been separated, with the remaining part of the gas which did not pass through the said diaphragm, substantially as described.

Signed at New York city this 23rd day of May 1903.

WILLIAM J. BALDWIN.

Witnesses:
 DAVID WALTER BROWN,
 CHARLES WEIN.